United States Patent
Comerford et al.

(10) Patent No.: US 12,460,072 B2
(45) Date of Patent: Nov. 4, 2025

(54) PROPYLENE-BASED COMPOSITION FOR PIPES

(71) Applicant: BASELL POLIOLEFINE ITALIA S.R.L., Milan (IT)

(72) Inventors: Sean Comerford, Neath (GB); Monica Galvan, Ferrara (IT); Giampaolo Pellegatti, Ferrara (IT); Francesca Tisi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 897 days.

(21) Appl. No.: 17/763,094

(22) PCT Filed: Sep. 4, 2020

(86) PCT No.: PCT/EP2020/074772
§ 371 (c)(1),
(2) Date: Mar. 23, 2022

(87) PCT Pub. No.: WO2021/058264
PCT Pub. Date: Apr. 1, 2021

(65) Prior Publication Data
US 2022/0340744 A1  Oct. 27, 2022

(30) Foreign Application Priority Data
Sep. 23, 2019 (EP) .................................. 19198959

(51) Int. Cl.
*C08L 23/16* (2006.01)
*C08L 23/0807* (2025.01)

(52) U.S. Cl.
CPC ........... *C08L 23/16* (2013.01); *C08L 23/0815* (2013.01); *C08L 2203/18* (2013.01); *C08L 2205/025* (2013.01); *C08L 2207/02* (2013.01)

(58) Field of Classification Search
CPC .. C08L 23/16; C08L 23/0815; C08L 2203/18; C08L 2205/025; C08L 2207/00
See application file for complete search history.

(56) References Cited

U.S. PATENT DOCUMENTS

2014/0080953 A1* 3/2014 Goberti .................. C08L 23/14
524/400

FOREIGN PATENT DOCUMENTS

| CN | 104204071 A | 12/2014 |
|---|---|---|
| CN | 105849178 A | 8/2016 |
| CN | 106795347 A | 5/2017 |
| CN | 109790344 A | 5/2019 |
| EP | 0330315 A2 | 8/1989 |
| EP | 2589523 A1 | 5/2013 |
| WO | 2015090594 A1 | 6/2015 |
| WO | 2017071847 A1 | 5/2017 |

OTHER PUBLICATIONS

International Search Report and Written Opinion mailed Dec. 8, 2020 (Dec. 8, 2020) for corresponding PCT/EP2020/074772.

* cited by examiner

*Primary Examiner* — Shane Fang

(57) ABSTRACT

A polyolefin composition made from or containing a first heterophasic polyolefin polymer A) made from or containing a first crystalline propylene homopolymer matrix, a first propylene ethylene copolymer having an ethylene content ranging from 20.0 wt % up to 35.0 wt %, a second propylene ethylene copolymer having an ethylene content ranging from 55.0 wt % up to 70.0 wt %, and a second heterophasic polyolefin polymer B) made from or containing a second crystalline propylene homopolymer matrix, an ethylene $C_4$-$C_{10}$ α-olefin copolymer having an ethylene content ranging from 65.0 wt % up to 85.0 wt %, and a third propylene ethylene copolymer having an ethylene content ranging from 40.0 wt % up to 50.0 wt %.

14 Claims, No Drawings

PROPYLENE-BASED COMPOSITION FOR PIPES

This application is the U.S. National Phase of PCT International Application PCT/EP2020/074772, filed Sep. 4, 2020, claiming benefit of priority to European Patent Application No. 19198959.9, filed Sep. 23, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polyolefin composition made from or containing two heterophasic polyolefin polymers as well as coatings of pipes and field joint coatings of pipes made therefrom.

BACKGROUND OF THE INVENTION

Pipelines are used in the oil and gas industry for the transportation of hydrocarbons. In some instances, hydrocarbon deposits are found under the sea floor and pipelines are laid on the sea floor for transporting the hydrocarbons to a storage or production facility.

To produce a pipeline, the pipe ends of the pipe sections are joined together. Welding or other joining techniques may be used. The pipe sections are joined at a pipe joint, such that the coating end faces of the pipe sections are located at opposite sides of the pipe joint.

In some instances and after the pipe sections are joined, a joint coating covers the pipe ends and the pipe joint. The joint coating should bond with the factory applied pipe coating, thereby protecting the pipe on the seafloor. The pipe sections are joined together in the field before the pipes are installed in the sea, either as risers between the seafloor and the surface, or laid on the seabed. The coating of the pipe joints is therefore performed in the field, which is referred to as a "field joint coating."

In some instances, the pipe coatings and field joint coatings protect the pipe from the seawater which can cause corrosion, provide mechanical protection, or provide mechanical properties to withstand the hydrostatic pressure experienced at a water depth.

In some instances, materials used for these purposes are polyolefins such as polypropylene (PP) or polyethylene (PE) and polyurethane (PU) including glass syntactic polyurethane (GSPU).

SUMMARY OF THE INVENTION

In a general embodiment, the present disclosure provides a polyolefin composition made from or containing:
from 2 wt % to 40 wt %, based upon the total weight of the polyolefin composition, of a first heterophasic polyolefin polymer A) made from or containing:
- a1) a first crystalline propylene homopolymer matrix,
- a2) a first propylene ethylene copolymer having an ethylene content ranging from 20.0 wt % up to 35.0 wt %, based upon the total weight of the first propylene ethylene copolymer, and
- a3) a second propylene ethylene copolymer having an ethylene content ranging from 55.0 wt % up to 70.0 wt %, based upon the total weight of the second propylene ethylene copolymer, wherein the first heterophasic polyolefin polymer A) having xylene soluble content measured according to ISO 16152, 2005 ranging from 20.0 wt % to 40.0 wt %, based upon the total weight of the first heterophasic polyolefin polymer, and intrinsic viscosity of the xylene soluble fraction at 25° C. ranging from 3.0 dl/g to 4.0 dl/g,
and from 60 wt % to 98 wt %, based upon the total weight of the polyolefin composition, of a second heterophasic polyolefin polymer B) made from or containing:
- b1) a second crystalline propylene homopolymer matrix,
- b2) an ethylene $C_4$-$C_{10}$ α-olefin copolymer having an ethylene content ranging from 65.0 wt % up to 85.0 wt %, based upon the total weight of the ethylene $C_4$-$C_{10}$ α-olefin copolymer, and
- b3) a third propylene ethylene copolymer having an ethylene content ranging from 40.0 wt % up to 50.0 wt %, based upon the total weight of the third propylene ethylene copolymer, wherein the second heterophasic polyolefin polymer B) having xylene soluble content measured according to ISO 16152, 2005 ranging from 25.0 wt % to 45.0 wt %, based upon the total weight of the second heterophasic polyolefin polymer, and intrinsic viscosity of the xylene soluble fraction at 25° C. ranging from 1.5 dl/g to 2.8 dl/g,
the sum A)+B) being 100.

In some embodiments, the present disclosure provides a process for field joint coating pipes including the step of coating a pipe joint with the polyolefin composition.

In some embodiments, the present disclosure provides a process for producing a joint coating on pipes made from or containing the polyolefin composition.

DETAILED DESCRIPTION OF THE INVENTION

In some embodiments, the polyolefin composition is made from or containing: from 2 wt % to 40 wt %, alternatively from 5 wt % to 25 wt %, alternatively from 5 wt % to 20 wt %, based upon the total weight of the polyolefin composition, of a first heterophasic polyolefin polymer A) made from or containing:
- a1) a first crystalline propylene homopolymer matrix,
- a2) a first propylene ethylene copolymer having an ethylene content ranging from 20.0 wt % up to 35.0 wt %, based upon the total weight of the first propylene ethylene copolymer, and
- a3) a second propylene ethylene copolymer having an ethylene content ranging from 55.0 wt % up to 70.0 wt %, based upon the total weight of the second propylene ethylene copolymer, wherein the first heterophasic polyolefin polymer A) having xylene soluble content measured according to ISO 16152, 2005 ranging from 20.0 wt % to 40.0 wt %, based upon the total weight of the first heterophasic polyolefin polymer, and intrinsic viscosity of the xylene soluble fraction at 25° C. ranging from 3.0 dl/g to 4.0 dl/g,
and from 60 wt % to 98 wt %, alternatively from 75 wt % to 95 wt %, alternatively from 80 wt % to 95 wt %, based upon the total weight of the polyolefin composition, of a second heterophasic polyolefin polymer B) made from or containing:
- b1) a second crystalline propylene homopolymer matrix,
- b2) an ethylene $C_4$-$C_{10}$ α-olefin copolymer having an ethylene content ranging from 65.0 wt % up to 85.0 wt %, based upon the total weight of the ethylene $C_4$-$C_{10}$ α-olefin copolymer, and b3) a third propylene ethylene copolymer having an ethylene content ranging from 40.0 wt % up to 50.0 wt %, based upon the total weight of the third propylene ethylene copolymer, wherein the second heterophasic polyolefin polymer B) having xylene soluble content measured according to ISO 16152, 2005 ranging from 25.0 wt % to 45.0 wt %, based upon the total weight of the second heterophasic polyolefin polymer, and intrinsic viscosity of the xylene soluble fraction at 25° C. ranging from 1.5 dl/g to 2.8 dl/g, the sum A)+B) being 100.

In some embodiments, the polyolefin composition has a MFR (23° C./5 kg ISO 1133) ranging from 5.0 to 30.0 g/10 min, alternatively from 8.0 to 15.0 g/10 min.

As used herein, the term "heterophasic polymer" refers to an elastomeric polyolefin copolymer is (finely) dispersed in the matrix, that is, in the propylene homopolymer or copolymer. In other words, the elastomeric polyolefin copolymers forms inclusions in the matrix. As such, the matrix contains (finely) dispersed inclusions, wherein the inclusions are not part of the matrix and the inclusions contain the elastomeric propylene copolymers. In some embodiments and as used herein, the term "inclusion" indicates that the matrix and the inclusion form different phases within the heterophasic system, wherein the inclusions are visible by high resolution microscopy. In some embodiments, the high-resolution microscopy is electron microscopy or scanning force microscopy.

In some embodiments, the first crystalline propylene homopolymer matrix a1) has a fraction insoluble in xylene at 25° C. higher than 90 wt %, alternatively higher than 95 wt %, alternatively higher than 97 wt %, based upon the total weight of the first crystalline propylene homopolymer matrix.

In some embodiments, the second crystalline propylene homopolymer matrix b1) has a fraction insoluble in xylene at 25° C., alternatively higher than 90 wt %, alternatively higher than 95 wt %, alternatively higher than 97 wt %, based upon the total weight of the second crystalline propylene homopolymer matrix.

As used herein, the term "copolymer" a polymer formed by two monomers, propylene and ethylene for components a2), a3) and b3), and ethylene and $C_4$-$C_{10}$ α-olefin for component b2).

In some embodiments, the $C_4$-$C_{10}$ α-olefin in ethylene $C_4$-$C_{10}$ α-olefin copolymer b2) is selected from the group consisting of 1-butene, 1-hexene and 1-octene. In some embodiments, the $C_4$-$C_{10}$ α-olefin is 1-butene.

As used herein, the term "xylene soluble" or "xylene soluble fraction" refers to the fraction soluble in xylene at 25° C. measured according to ISO 16152, 2005.

In some embodiments, the polyolefin composition is made from or containing from 5 wt % to 25 wt % of the first heterophasic polyolefin polymer A) and from 75 wt % to 95 wt % of the second heterophasic polyolefin polymer B, the sum A)+B) being 100, alternatively from 5 wt % to 20 wt % of the first heterophasic polyolefin polymer A) and from 80 wt % to 95 wt % of the second heterophasic polyolefin polymer B, the sum A)+B) being 100.

In some embodiments, the first heterophasic polyolefin polymer A) is made from or containing from 40 wt % to 80 wt %, of component a1), from 5 wt % to 30 wt % of component a2) and from 10 wt % to 50 wt % of component a3), alternatively from 50 wt % to 70 wt % of component a1), from 7 wt % to 20 wt % of component a2) and from 15 wt % to 40 wt % of component a3), the sum a1)+a2)+a3) being 100.

In some embodiments, the second heterophasic polyolefin polymer B) is made from or containing from 40 wt % to 80 wt %, of component b1), from 5 wt % to 40 wt % of component b2) and from 10 wt % to 40 wt % of component b3), alternatively from 50 wt % to 70 wt % of component b1), from 10 wt % to 30 wt % of component b2) and from 15 wt % to 30 wt % of component b3), the sum b1)+b2)+b3) being 100.

In some embodiments, the first heterophasic polyolefin polymer A) has a MFR (230° C./5 kg ISO 1133) ranging from 0.5 g/10 min to 50.0 g/10 min, alternatively from 5.0 to 20.0 g/10 min, alternatively from 5.0 to less than 10.0 g/10 min.

In some embodiments, the second heterophasic polyolefin polymer B) has a MFR (230° C./5 kg ISO 1133) ranging from 0.5 g/10 min to 50.0 g/10 min, alternatively from 5.0 to 20.0 g/10 min, alternatively from 10.0 to 15.0 g/10 min.

In some embodiments, the first heterophasic polyolefin polymer A) has a Charpy impact strength (notched, ISO 179) at −20° C. ranging from 10 to 20 KJ/m$^2$.

In some embodiments, the first heterophasic polyolefin polymer A) has a Charpy impact strength (notched, ISO 179) at 23° C. ranging from 55 to 75 KJ/m$^2$.

In some embodiments, the second heterophasic polyolefin polymer B) has a Charpy impact strength (notched, ISO 179) at −20° C. ranging from 30 to 60 KJ/m$^2$.

In some embodiments, the second heterophasic polyolefin polymer B) has a Charpy impact strength (notched, ISO 179) at 23° C. ranging from 30 to 60 KJ/m$^2$.

In some embodiments, the first heterophasic polyolefin polymer A) has a Vicat softening point (A50, ISO 306) ranging from 125 to 145° C.

In some embodiments, the second heterophasic polyolefin polymer B) has a Vicat softening point (A50, ISO 306) at −20° C. ranging from 110 to 125° C.

In some embodiments, the heterophasic polyolefin polymers are commercially available under the tradenames of Hifax EP3080 and Hifax CA7201 A from LyondellBasell.

In some embodiments, the polyolefin composition is prepared by melt blending the first and second heterophasic polyolefin polymers A) and B) in an extruder.

In some embodiments, the polyolefin composition is further made from or containing additives. In some embodiments, the additives are selected from the group consisting of antioxidants, slipping agents, process stabilizers, antiacids and nucleants.

In some embodiments, the present disclosure provides field joint coatings on pipes made from or containing the polyolefin composition. In some embodiments, the present disclosure provides a process for field joint coating of pipes including the step of coating a pipe with the polyolefin composition.

In some embodiments and as used herein, the term "pipe" refers to pipe fittings, valves, and parts for a hot water piping system. In some embodiments, the term "pipe" also refers to single and multilayer pipes, wherein one or more of the layers is a metal layer. In some embodiments, the pipes are further made from or containing an adhesive layer.

The following examples are given to illustrate the present disclosure without limiting purpose.

EXAMPLES

Characterization Methods

Melting temperature and crystallization temperature: Determined by differential scanning calorimetry (DSC). A sample weighing 6±1 mg was heated to 220±1° C. at a rate of 20° C./min and maintained at 220±1° C. for 2 minutes in nitrogen stream. The sample was cooled at a rate of 20° C./min to 40±2° C. and maintained at this temperature for 2 min, thereby crystallizing the sample. The sample was again fused, at a temperature rise rate of 20° C./min up to 220° C.±1. The melting scan was recorded. A thermogram was obtained. The melting temperatures and crystallization temperatures were determined.

Melt Flow Rate: Determined according to the method ISO 1133-1 2011 (230° C., 2.16 kg).

Solubility in xylene: Determined as follows.

2.5 g of polymer and 250 ml of xylene were introduced in a glass flask equipped with a refrigerator and a magnetic stirrer. The temperature was raised in 30 minutes up to the boiling point of the solvent. The resulting clear solution was then kept under reflux and stirring for further 30 minutes. The closed flask was then kept for 30 minutes in a bath of ice and water and in thermostatic water bath at 25° C. for 30 minutes as well. The resulting solid was filtered on quick filtering paper. 100 ml of the filtered liquid were poured in a previously weighed aluminum container, which was heated on a heating plate under nitrogen flow, thereby removing the solvent by evaporation. The container was then kept in an oven at 80° C. under vacuum until constant weight was obtained. The weight percentage of polymer soluble in xylene at room temperature was then calculated.

Ethylene (C2) and 1-butene (C4) Content

The content of comonomers was determined by infrared (IR) spectroscopy by collecting the IR spectrum of the sample vs. an air background with a Fourier transform infrared spectrometer (FTIR). The instrument data acquisition parameters were:
 purge time: 30 seconds minimum
 collect time: 3 minutes minimum
 apodization: Happ-Genzel
 resolution: 2 cm$^{-1}$.

Sample Preparation—Using a hydraulic press, a thick sheet was obtained by compression molding about 1 g of sample between two aluminum foil sheets. A small portion was cut from the resulting sheet to mold a film. The film thickness was set to have a maximum absorbance of the $CH_2$ absorption band at ~720 cm$^{-1}$ of 1.3 a.u. (% Transmittance>5%). The molding conditions were carried out at a temperature of about 180±10° C. (356° F.) and a pressure of about 10 kg/cm$^2$ (142.2 psi) for about one minute. The pressure was then released. The sample was removed from the press and cooled to room temperature. The spectrum of the pressed film sample was recorded as a function of absorbance vs. wavenumbers (cm$^{-1}$). The following measurements were used to calculate ethylene ($C_2$) and 1-butene ($C_4$) contents:
 a) Area ($A_t$) of the combination absorption bands between 4482 and 3950 cm$^{-1}$, which was used for spectrometric normalization of film thickness.
 b) Area ($A_{c2}$) of the absorption band due to methylenic sequences ($CH_2$ rocking vibration) in a range of 660-790 cm$^{-1}$ after a proper digital subtraction of an isotactic polypropylene (IPP) and a $C_2C_4$ references spectrum.
 c) The factor of subtraction ($FCR_{c4}$) between the spectrum of the polymer sample and the $C_2C_4$ reference spectrum: The reference spectrum was obtained by performing a digital subtraction of a linear polyethylene from a $C_2C_4$ copolymer to extract the $C_4$ band (ethyl group at ~771 cm$^{-1}$).

The ratio $A_{c2}/A_t$ was calibrated by analyzing ethylene-propylene standard copolymers, as determined by NMR spectroscopy.

To calculate the ethylene ($C_2$) and 1-butene ($C_4$) content, calibration curves were obtained by using reference samples of ethylene and 1-butene that were detectable by $^{13}$C NMR.

Calibration for ethylene—A calibration curve was obtained by plotting $A_{c2}/A_t$ versus ethylene molar percent (% $C_{2m}$), and the coefficients $a_{c2}$, $b_{c2}$ and $c_{c2}$ were then calculated via linear regression.

Calibration for 1-butene—A calibration curve was obtained by plotting $FCR_{c4}/A_t$ versus butane molar percent (% $C_4$m), and the coefficients $a_{c4}$, $b_{c4}$ and $C_{c4}$ were then calculated via linear regression.

The spectra of the samples were recorded and then ($A_t$), ($A_{c2}$) and ($FCR_{c4}$) were calculated.

The ethylene content (% molar fraction $C_{2m}$) of the sample was calculated as follows:

$$\%C2m = -b_{C2} + \frac{\sqrt{b_{C2}^2 - 4 \cdot a_{C2} \cdot \left(C_{C2} - \frac{A_{C2}}{A_t}\right)}}{2 \cdot a_{C2}}$$

The 1-butene content (% molar fraction $C_{4m}$) of the sample was calculated as follows:

$$\%C4m = -b_{C4} + \frac{\sqrt{b_{C4}^2 - 4 \cdot a_{C4} \cdot \left(C_{C4} - \frac{FCR_{C4}}{A_t}\right)}}{2 \cdot a_{C4}}$$

where $a_{c4}$, $b_{c4}$, $c_{c4}$ $a_{c2}$, $b_{c2}$, $c_{c2}$ are the coefficients of the two calibrations.

Changes from mol % to wt % were calculated by using molecular weights of the compounds.

Intrinsic Viscosity

The intrinsic viscosity was determined in tetrahydronaphthalene at 135° C.

Tensile strength at yield, tensile strain at break, elongation at break: determined according to ISO method 527-1, Type 1A on rectangular specimens (80×10×4 mm) from T-bars.

Flexural modulus: determined according to ISO method 178.

Charpy notched impact test: determined on V-notched samples (80×10×4 mm) according to ISO 179/1eA (2000) from T-bars.

T-bar preparation (injection molded): determined according to ISO 1873-2 (1989).

Vicat softening point: determined according to ISO 306 (2004) 1 Kg (9.81N).

EXAMPLES

The compositions described in the examples were produced with Werner WP40 twin-screw extruder (screw diameter: 2×53, 36D; screw rotation speed of 150 rpm; melt temperature of 230° C.).

Comparative Example 1

Comparative Example 1 was an elastomer modified polypropylene, having MFR 230° C., 2.16 kg 0.3 g/10 min, commercially available under the tradename Borcoat EA165E from Borealis AG.

Comparative Example 2

Comparative Example 2 was prepared as described for IE2 in Patent Cooperation Treaty Publication No. WO2015/090594.

Example 1

The composition was made from according to the following formulation:
- 87.6 wt % of a commercial polypropylene heterophasic copolymer PP heco 1 (Hifax CA 7201A, LyondellBasell Industries) having MFR 230° C., 2.16 kg 12.0 g/10 min, xylene soluble content 35.0 wt %, intrinsic viscosity of the fraction soluble in xylene at 25° C. 2.3 dl/g, and ethylene content in b2) 73 wt %, ethylene content in b3) 45 wt %, split b1)/b2)/b3) 56/23/21, and α-olefin: 1-butene,
- 7.0 wt % of a commercial polypropylene heterophasic copolymer PP heco 2 (Hifax EP3080, LyondellBasell Industries) having MFR 230° C., 2.16 kg 7.5 g/10 min, xylene soluble content 32.0 wt %, intrinsic viscosity of the fraction soluble in xylene at 25° C. 3.5 dl/g, ethylene content in a2) 28 wt %, ethylene content in a3) 60 wt %, split a1)/a2)/a3) 60/14/26), and
- 5.4 wt % of an additive package made from or containing 1.2 wt % of Dioctadecyl 3,3'-thiodipropionate, 0.6 wt % of Irgafos® 168, 0.6 wt % of Irganox® 1010, BASF, 0.9 wt % of talc HM05, and 2.1 wt % of TiO2 Tiona 595.

Example 2

The composition was made from according to the following formulation:
- 72.1 wt % of a commercial polypropylene heterophasic copolymer PP heco 1 (Hifax CA 7201A, LyondellBasell Industries) having MFR 230° C., 2.16 kg 12.0 g/10 min, xylene soluble content 35.0 wt %, intrinsic viscosity of the fraction soluble in xylene at 25° C. 2.3 dl/g, ethylene content in b2) 73 wt %, ethylene content in b3) 45 wt %, split b1)/b2)/b3) 56/23/21, and α-olefin: 1-butene,
- 22.5 wt % of a commercial polypropylene heterophasic copolymer PP heco 2 (Hifax EP3080, LyondellBasell Industries) having MFR 230° C., 2.16 kg 7.5 g/10 min, xylene soluble content 32.0 wt %, intrinsic viscosity of the fraction soluble in xylene at 25° C. 3.5 dl/g, ethylene content in a2) 28 wt %, ethylene content in a3) 60 wt %, split a1)/a2)/a3) 60/14/26), and
- 5.4 wt % of an additive package made from or containing 1.2 wt % of Dioctadecyl 3,3'-thiodipropionate 0.6 wt % of Irgafos® 168, 0.6 wt % of Irganox® 1010, BASF, 0.9 wt % of talc HM05, and 2.1 wt % of TiO2 Tiona 595.

The properties of Examples 1, 2 and Comparative Examples 1 and 2 are reported in Table 1.

TABLE 1

| | | Comp Ex 1 | Comp Ex 2 | Ex 1 | Ex 2 |
|---|---|---|---|---|---|
| Crystalline matrix | | — | Propylene random copolym. | Propylene homopolym. | Propylene homopolym. |
| MFR | [g/10 min] | 0.3 | 4.2 | 11.8 | 10.9 |
| Density | [g/cm$^3$] | 0.896 | — | 0.914 | 0.915 |
| Tensile stress at yield | [MPa] | 18.0 | — | 16.0 | 14.9 |
| Tensile strain at break | [%] | 350 | — | >400.0 | 90.0 |
| Elongation at break | [%] | — | 538 | 180 | 90 |
| Vicat softening point | [° C.] | 130 | 128 | 120.0 | 118.8 |
| Flexural modulus | [MPa] | — | — | 850 | 770 |
| Charpy at −40° C. | [kJ/m$^2$] | — | — | 7.8 | 8.3 |
| Charpy at −30° C. | [kJ/m$^2$] | 6 | — | 13.4 | 11.1 |
| Charpy at −20° C. | [kJ/m$^2$] | 20 | 4 | 55.3 | 14.9 |
| Charpy at −10° C. | [kJ/m$^2$] | — | — | 64.5 | 57.4 |
| Charpy at 0° C. | [kJ/m$^2$] | 50 | 4 | 66.2 | 64.1 |
| Charpy at 23° C. | [kJ/m$^2$] | 70 | 12 | 67.6 | 65.7 |
| Melting temperature | [° C.] | 164 | 162 | 161.5 | 162.7 |
| Crystallization temperature | [° C.] | — | — | 119.2 | 117.3 |

What is claimed is:

1. A polyolefin composition comprising:
from 2 wt % to 40 wt %, based upon the total weight of the polyolefin composition, of a first heterophasic polyolefin polymer A) comprising:
- a1) a first crystalline propylene homopolymer matrix,
- a2) a first propylene ethylene copolymer having an ethylene content ranging from 20.0 wt % up to 35.0 wt %, based upon the total weight of the first propylene ethylene copolymer, and
- a3) a second propylene ethylene copolymer having an ethylene content ranging from 55.0 wt % up to 70.0 wt %, based upon the total weight of the second propylene ethylene copolymer, and
    wherein the first heterophasic polyolefin polymer A) having xylene soluble content measured according to ISO 16152, 2005 ranging from 20.0 wt % to 40.0 wt %, based upon the total weight of the first heterophasic polyolefin polymer, and intrinsic viscosity of the xylene soluble fraction at 25° C. ranging from 3.0 dl/g to 4.0 dl/g, and from 60 wt % to 98 wt %, based upon the total weight of the polyolefin composition, of a second heterophasic polyolefin polymer B) comprising:

b1) a second crystalline propylene homopolymer matrix, b2) an ethylene $C_4$-$C_{10}$ α-olefin copolymer having an ethylene content ranging from 65.0 wt % up to 85.0 wt %, based upon the total weight of the ethylene $C_4$-$C_{10}$ α-olefin copolymer, and b3) a third propylene ethylene copolymer having an ethylene content ranging from 40.0 wt % up to 50.0 wt %, based upon the total weight of the third propylene ethylene copolymer, wherein the second heterophasic polyolefin polymer B) having xylene soluble content measured according to ISO 16152, 2005 ranging from 25.0 wt % to 45.0 wt %, based upon the total weight of the second heterophasic polyolefin polymer, and intrinsic viscosity of the xylene soluble fraction at 25° C. ranging from 1.5 dl/g to 2.8 dl/g, the sum A)+B) being 100.

2. The polyolefin composition according to claim 1 having a MFR (23° C./5 kg ISO 1133) ranging from 5.0 to 30 g/10 min.

3. The polyolefin composition according to claim 1 comprising:

from 5 wt % to 25 wt % of the first heterophasic polyolefin polymer A), and from 75 wt % to 95 wt % of the second heterophasic polyolefin polymer B), the sum A)+B) being 100.

4. The polyolefin composition according to claim 1 comprising:

from 5 wt % to 20 wt % of the first heterophasic polyolefin polymer A), and from 80 wt % to 95 wt % of the second heterophasic polyolefin polymer B), the sum A)+B) being 100.

5. The polyolefin composition according to claim 1, wherein the first heterophasic polyolefin polymer A) comprises from 40 wt % to 80 wt %, of component a1), from 5 wt % to 30 wt % of component a2) and from 10 wt % to 50 wt % of component a3), the sum a1)+a2)+a3) being 100.

6. The polyolefin composition according to claim 1, wherein the second heterophasic polyolefin polymer B) comprises from 40 wt % to 80 wt %, of component b1), from 5 wt % to 40 wt % of component b2) and from 10 wt % to 40 wt % of component b3), the sum b1)+b2)+b3) being 100.

7. The polyolefin composition according to claim 1, wherein the α-olefin of the ethylene $C_4$-$C_{10}$ α-olefin copolymer b2) is 1-butene.

8. The polyolefin composition according to claim 1, wherein the first heterophasic polyolefin polymer A) has a MFR (230° C./5 kg ISO 1133) ranging from 0.5 g/10 min to 50.0 g/10 min.

9. The polyolefin composition according to claim 1, wherein the second heterophasic polyolefin polymer B) has a MFR (230° C./5 kg ISO 1133) ranging from 0.5 g/10 min to 50.0 g/10 min.

10. A process for producing a joint coating on pipes comprising the steps of:

producing the polyolefin composition according to claim 1 and coating pipe joints on pipes with the polyolefin composition.

11. The polyolefin composition according to claim 1, wherein the first heterophasic polyolefin polymer A) has a MFR (230° C./5 kg ISO 1133) ranging from 5.0 to 20.0 g/10 min.

12. The polyolefin composition according to claim 1, wherein the first heterophasic polyolefin polymer A) has a MFR (230° C./5 kg ISO 1133) ranging from 5.0 to less than 10.0 g/10 min.

13. The polyolefin composition according to claim 1, wherein the second heterophasic polyolefin polymer B) has a MFR (230° C./5 kg ISO 1133) ranging from 5.0 to 20.0 g/10 min.

14. The polyolefin composition according to claim 1, wherein the second heterophasic polyolefin polymer B) has a MFR (230° C./5 kg ISO 1133) ranging from 10.0 to 15.0 g/10 min.

* * * * *